United States Patent
Lewis et al.

(10) Patent No.: US 7,251,904 B2
(45) Date of Patent: Aug. 7, 2007

(54) TAPE RULE HAVING REORIENTED MEASURING BLADE

(76) Inventors: Steven W. Lewis, 120 Washington St., Woodbury, CT (US) 06798; Robert L. Brass, 45 Calhoun St., Washington, CT (US) 06794; John F. Frega, 16 Chestnut Ridge Rd., Holmdel, NJ (US) 07733

( * ) Notice: Subject to any disclaimer, the term of this patent is extended or adjusted under 35 U.S.C. 154(b) by 0 days.

(21) Appl. No.: 11/522,040

(22) Filed: Sep. 15, 2006

(65) Prior Publication Data

US 2007/0124951 A1    Jun. 7, 2007

Related U.S. Application Data

(63) Continuation-in-part of application No. 11/039,332, filed on Jan. 19, 2005, now Pat. No. 7,107,700.

(51) Int. Cl.
*G01B 3/10* (2006.01)

(52) U.S. Cl. .......................................... 33/769; 33/755
(58) Field of Classification Search .................. 33/755, 33/757, 759, 761, 768–770, 764
See application file for complete search history.

(56) References Cited

U.S. PATENT DOCUMENTS

| | | | | |
|---|---|---|---|---|
| 1,402,589 A | * | 1/1922 | Farrand | 33/769 |
| 1,983,503 A | * | 12/1934 | Volz | 33/769 |
| 4,155,168 A | * | 5/1979 | DuBois | 33/760 |
| 4,200,983 A | * | 5/1980 | West et al. | 33/767 |

FOREIGN PATENT DOCUMENTS

JP         2002131003 A  *  5/2002

\* cited by examiner

*Primary Examiner*—Yaritza Guadalupe-McCall
(74) *Attorney, Agent, or Firm*—Ira S. Dorman (57) ABSTRACT

A coilable tape rule includes a pair of rollers that are convexly rounded in both axial and transaxial planes, about which rollers the measuring blade moves during passage through the casing and which cause the blade to turn on its longitudinal axis so as to reorient its width dimension to a perpendicular relationship to the axis of coiling. The blade is of concavo-convex cross section and cooperates with the rollers for tracking control and to enhance the smoothness and reliability of extension and retraction.

16 Claims, 9 Drawing Sheets

TAPE RULE HAVING REORIENTED MEASURING BLADE

CROSS-REFERENCE TO RELATED APPLICATION

This application is a continuation-in-part of U.S. patent application Ser. No. 11/039,332, filed Jan. 19, 2005 issued Sep. 19, 2006 as U.S. Pat. No. 7,107,700, the entire specification of which is incorporated hereinto by reference thereto.

BACKGROUND OF THE INVENTION

It is often desirable to place the casing of a tape rule at a certain position with the measuring blade extended so as to enable measurements to be made at remote locations, and to do so without need for holding the casing. In the conventional tape rule the blade pays out through a peripheral aperture, and is oriented with its width dimension corresponding to that of the casing. Even if the casing has straight, flat edge sections on which it can be supported, therefore, standing the casing on edge (as must be done if the indicia on the face of the blade are to be visible) affords a very low level of stability. If left unattended, there is a likelihood that the rule casing will tip over, particularly if the extended blade is disturbed in any way, thus not only making it difficult to read the distance scale but, indeed, making the measurement itself unreliable due to displacement of the rule from its original position.

SUMMARY OF THE INVENTION

Accordingly, it is the broad object of the present invention to provide a novel coilable tape rule wherein the casing provides stable support and enables self-standing positioning, with the blade extended, with minimal concern for inadvertent displacement from a selected location.

A more specific object of the invention is to provide such a tape rule in which the measuring blade is reoriented, as it is extended from the casing, to a relationship in which its width dimension is nonparallel, and normally substantially perpendicular, to the axis of coiling.

Further specific objects of the invention are to provide such a tape rule in which extension and retraction of the measuring blade occurs smoothly and reliably, with steady tracking and without undue rubbing, drag, or material wear.

An additional object of the invention is to provide a novel coilable tape rule having a unique brake mechanism for maintaining the blade at selected positions of extension from the casing.

It has now been found that certain of the foregoing and related objects of the invention are attained by the provision of a coilable tape rule comprising: a casing having an aperture to the interior thereof; means for mounting a coiled measuring blade within the rule casing for extension therefrom and retraction thereinto through the aperture; a flexible (normally, resilient) measuring blade mounted upon the means for mounting, the measuring blade having a length dimension and a transverse width dimension and being coilable about an axis of blade coiling, within the casing, with its width dimension oriented parallel to the axis of coiling; and reorienting means for turning, or rotating, the measuring blade on its longitudinal axis so as to reorient the width dimension to a nonparallel relationship to the axis of coiling as the measuring blade is extended from said casing.

In most instances the nonparallel relationship of the measuring blade width dimension will be substantially perpendicular to the axis of coiling, achieved by effecting a quarter (i.e., 90°) turn, and the casing will comprise at least one wall having an effectively planar outside surface to which the axis of coiling is normal and to which the width dimension of the turned portion of the measuring blade is substantially parallel. The reorienting means incorporated into the tape rule may comprise transition structure disposed within the casing and providing a transition surface on which the measuring blade is supported during passage from the means for mounting toward the aperture of the casing. The transition structure may be fixed within said casing, to slidably support the measuring rule on its transition surface, or the transition surface may be on one or more roller members mounted within the casing; in either case, the transition surface will desirably be smoothly curvilinear. The reorienting means may also comprise channel-defining structure disposed within the casing and dimensioned and configured for slidably receiving and constraining the measuring blade. Such channel-defining structure will generally lead to the aperture of the casing, and it may function cooperatively with transition structure by slidably receiving the blade as it passes from the transition surface.

The means for mounting, employed in the tape rule, will usually comprise a spool for coilably receiving the measuring blade and being mounted for rotation about the axis of coiling. The casing will usually comprise a pair of spaced, substantially parallel sidewalls and a peripheral wall extending therebetween and thereabout, with the axis of coiling of the blade being oriented substantially normal to the sidewalls and with the aperture being formed through the peripheral wall. The measuring blade will normally be of concavo-convex transverse cross section, in its free state, and the measurement indicia (distance scale) on the extended portion of the measuring blade will normally face upwardly when the tape rule is supported from beneath; i.e., the indicia-bearing face of the blade will be directed oppositely to the outside surface of the casing on which the casing rests.

In the preferred embodiments of the invention, the tape rule employs a measuring blade that is preformed to have such a concavo-convex transverse cross section and is wound with its concave side facing inwardly toward the axis of coiling, and the reorienting means (for turning the measuring blade on its longitudinal axis) comprises a pair of roller members disposed within the rule casing. One of the roller members is rotatably mounted adjacent the "one" wall (i.e., a wall having an effectively planar exterior surface), with its axis of rotation substantially perpendicular to the axis of coiling of the measuring blade. The other roller member is rotatably mounted in a position displaced from the "one" wall, with its axis of rotation oriented generally transversely to the axis of coiling and at an acute included angle thereto. Each of the roller members has a central section that is convexly rounded, both in axial planes extending on and along the axis of rotation of the roller member and also in transaxial planes perpendicular thereto, to provide curvilinear contact, or transition, surfaces on the roller members. The measuring blade follows a travel path between the blade-mounting means and the peripheral wall aperture, sequentially over the roller members with the surface of the measuring blade on its concave side in engagement with the contact surfaces thereof, the roller members are so positioned that the "other" roller member lies more closely adjacent to the blade-mounting means, along the blade travel path, than does the "one" roller member.

The central section of each of the roller members employed in these embodiments will normally be circular in all transaxial planes. The central section of the "one" roller member will most desirably be generally elliptical (or of other arcuate form that is not truly circular) in its axial planes, whereas the central section of the "other" roller member will generally be circular in its axial planes, or at least substantially so (albeit other curvilinear shapes may be utilized here as well). The acute included angle at which axis of rotation of the "other" roller member is oriented, relative to the axis of coiling of the measuring blade, will normally have a value of 30° to 60°, and most typically of about 45°. The same axis will usually be inclined as well toward the axis of coiling, taken with reference to the "one" wall, with the included angle of inclination typically again having a value of about 45°.

In most instances the tape rule will additionally include a brake mechanism, operative for releaseably securing the measuring blade in positions extended from the casing. In one form the brake mechanism will comprise: a locking piece pivotably mounted in the casing adjacent the reorienting structure provided, and having an operating arm and a locking tab thereon, the locking tab extending generally radially from the axis of pivoting of the locking piece for movement toward and away from the transition structure and being positioned for pinching engagement of the measuring blade, disposed between the locking tab and the transition structure, against the transition surface when the locking tab is moved into close proximity thereto; and a toggle piece mounted for pivoted movement about an axis parallel to the axis of pivoting of the locking piece, such that pivoting in one direction will cause the toggle piece to act upon the operating arm of the locking piece so as to bring the locking tab into stable pinching engagement with the measuring blade, and pivoting in the opposite direction will cause the toggle piece to act upon the operating arm so as to displace the locking tab for release of the measuring blade. The toggle piece and the operating arm of the locking piece will advantageously have latching elements thereon disposed for operative interengagement during pivoting of the toggle piece in the "opposite direction," so as to effect such displacement of the locking tab. In particular, the latching element on the toggle piece may be a hook and the latching element on the locking piece may be a pin on the operating arm thereof. Although a manual (e.g., crank-operated) blade-retraction and rewinding mechanism may be employed, the tape rule of the invention will usually include power means for effecting return of the extended portion of the measuring blade into the casing. Such power means will normally comprise a spring that applies constant retracting force to the mounting spool.

DETAILED DESCRIPTION OF THE ILLUSTRATED EMBODIMENTS

Turning initially to FIGS. 1 through 5 of the drawings, therein illustrated is a first form of coilable tape rules embodying the present invention and consisting of a casing base, comprised of an outer wall 10 and an inner plate 12, and a casing cover 14. A slide 16 for operating the brake mechanism (not illustrated) projects through an opening 17 defined in the peripheral wall of the cover 14, which brake mechanism serves of course to maintain the blade 20 in selected positions of extension against the retractive force of the power-return spring 19, constantly applied to the spool 18 on which the blade 20 is wound. The blade 20 is of course of great length relative to its width dimension, taken with respect to which dimension it is of concavo-convex cross-sectional form, as is conventional; it also terminates in a standard engagement hook 22.

Figure 1:
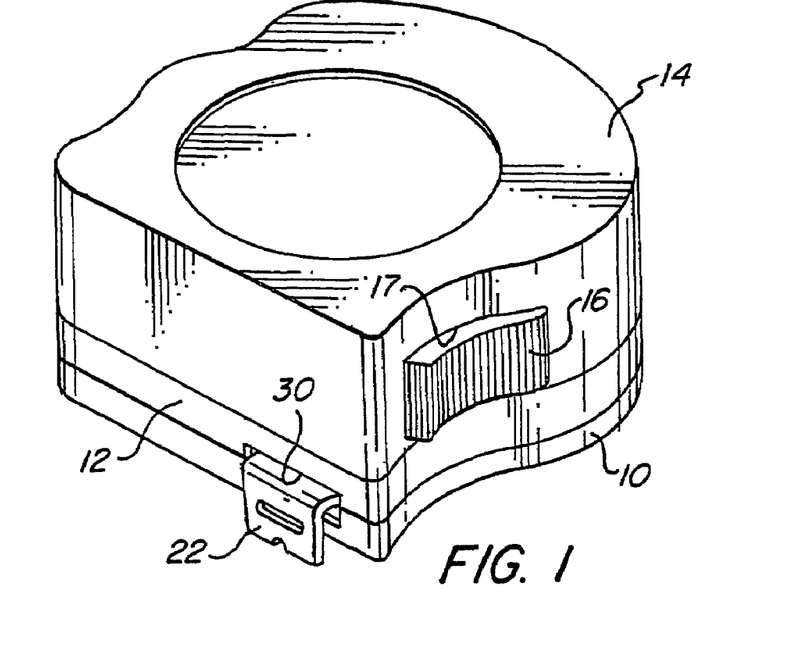
FIG. 1 of the drawings is a front perspective view of one form of coilable tape rules embodying the present invention.
Figure 2:
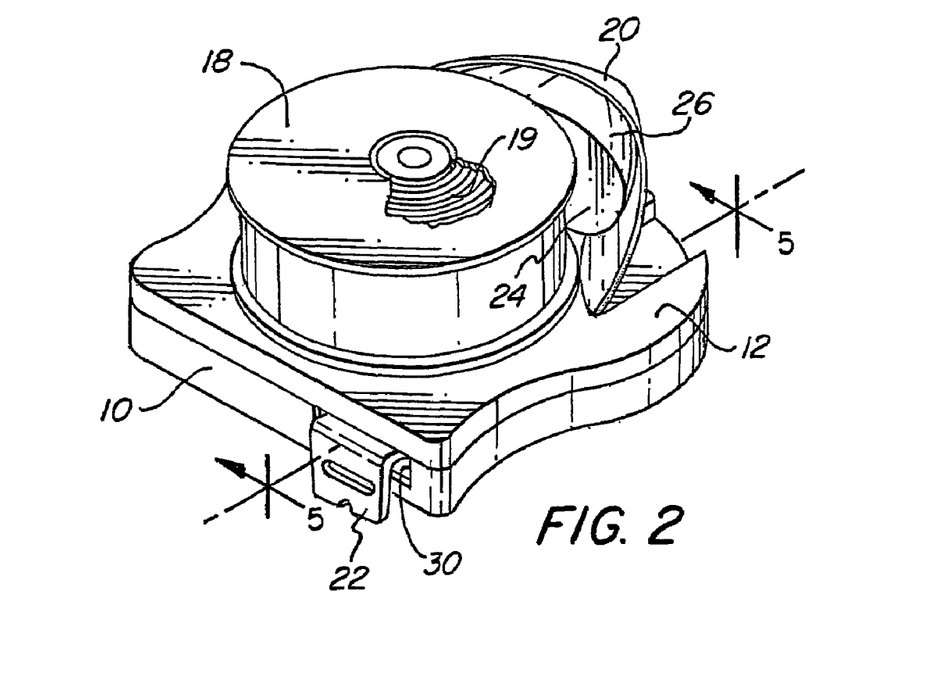
FIG. 2 is a front perspective view of the tape rule of FIG. 1, from which the casing cover has been removed to expose internal features, a section of the spool within the casing being broken away to expose a further feature.
Figures 3A, 3B, 4A, 4B:
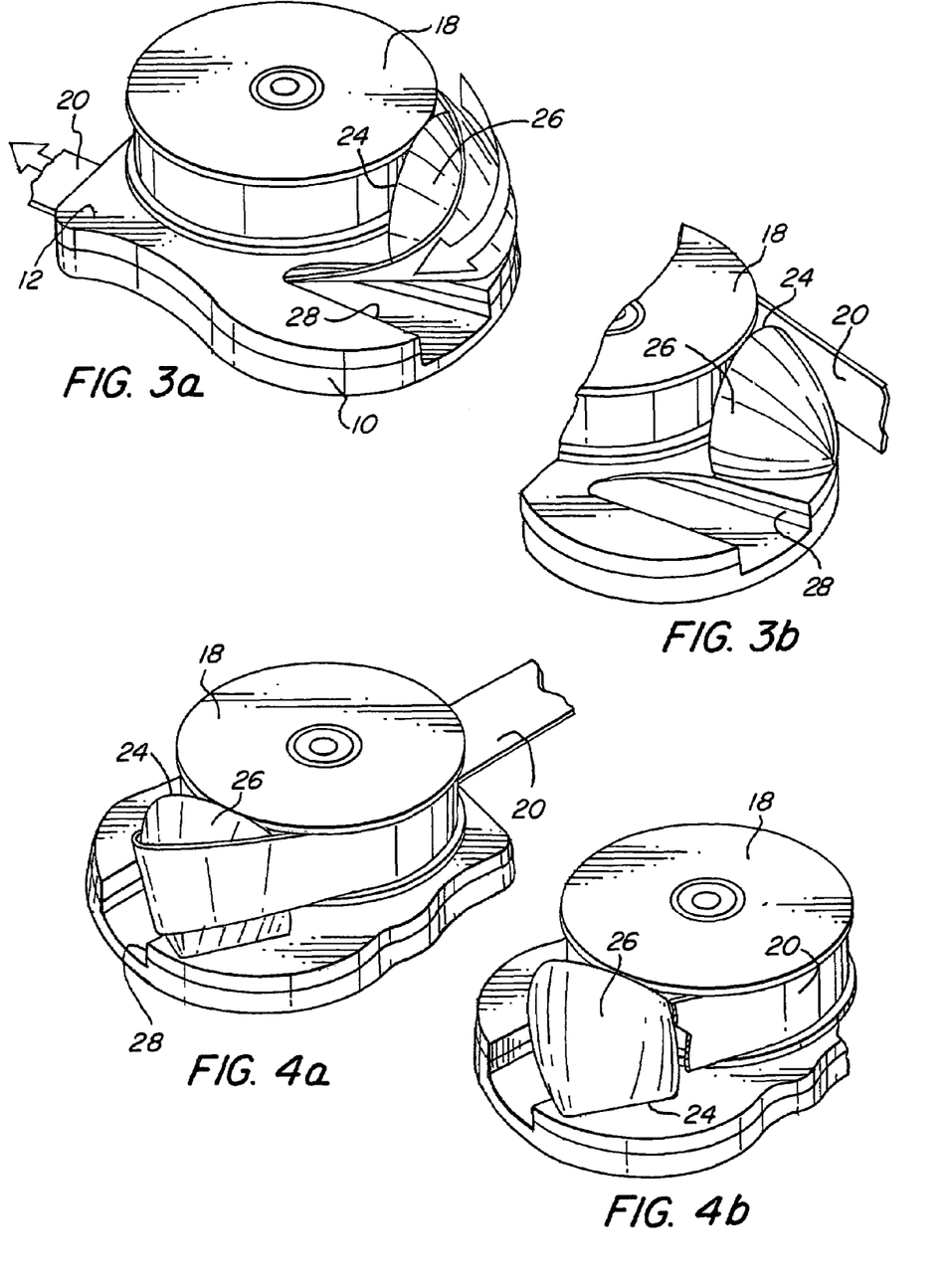
FIGS. 3a and 3b are fragmentary rear perspective views showing the relationship of the measuring blade to the reorienting transition structure provided within the rule.
FIGS. 4a and 4b are similar views, taken from a different angle.
Figure 5:
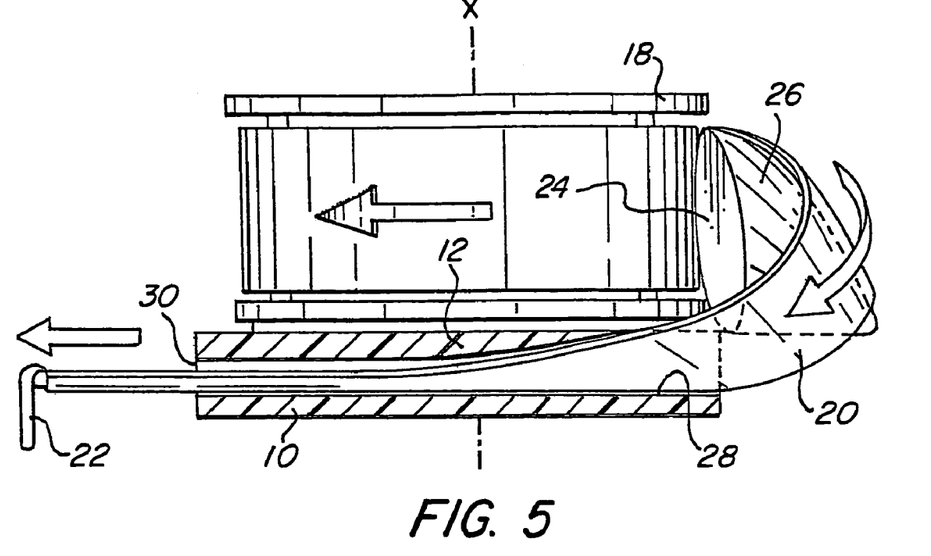
FIG. 5 is an elevational view of the tape rule of the foregoing figures, taken along line 5-5 of FIG. 2.
Figure 6:
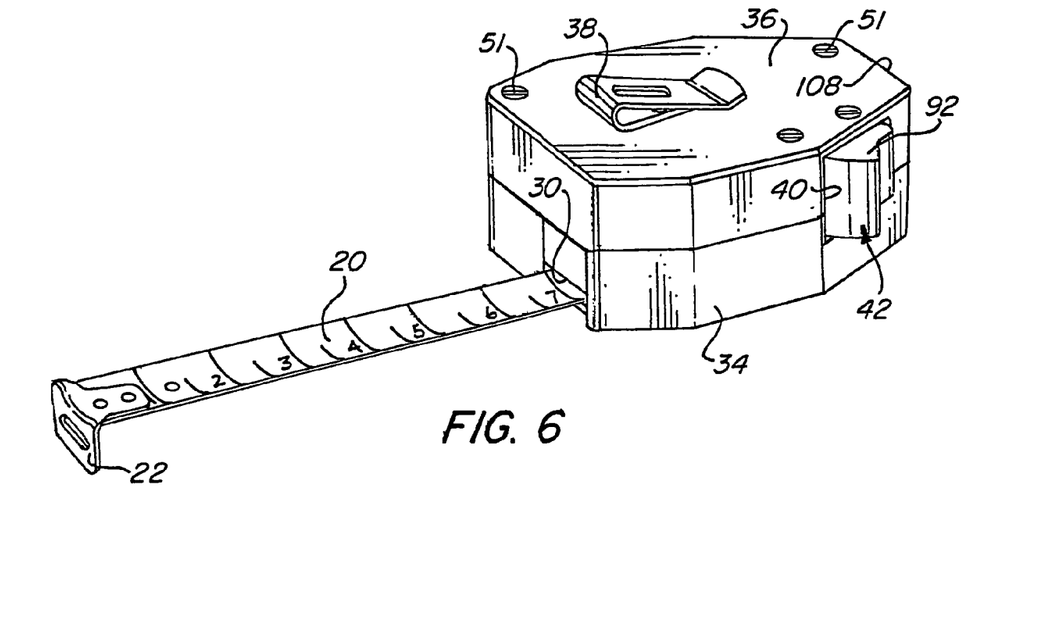
FIG. 6 is perspective view of a second form of coilable tape rules embodying the present invention, showing the measuring blade partially extended from the casing.
Figure 7:
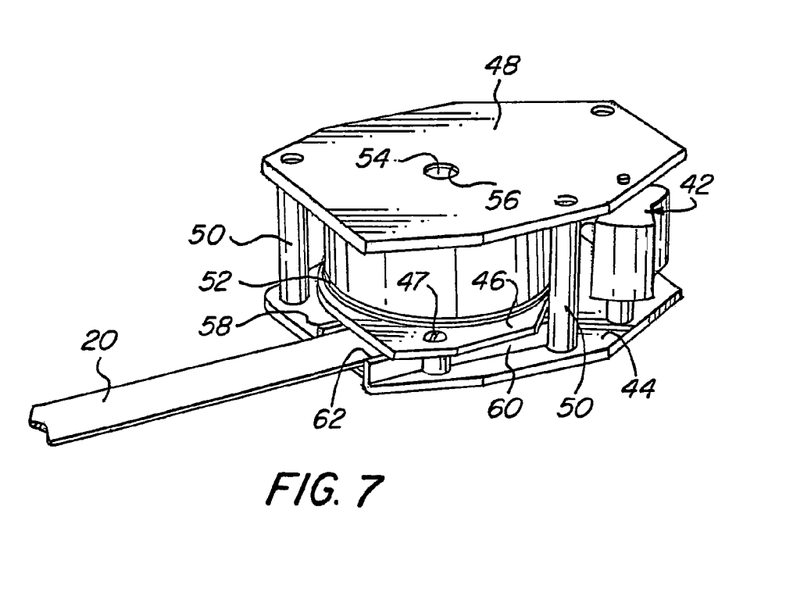
FIG. 7 is a similar view of the tape rule of FIG. 6, from which housing pieces have been removed.

As is perhaps best seen in FIGS. 3 through 5 of the drawings, upon passage from the spool 18 the measuring blade 20 wraps partially about the transition structure 24, reversing its direction and also changing its widthwise orientation by gradually effecting a quarter turn of the blade on its longitudinal axis, as it traverses the rounded, generally conic surface 26. Thus, the blade 20 is reoriented from a relationship in which its width dimension is parallel to the coiling axis "X" to one in which, upon exiting the casing, it is perpendicular thereto. It can be seen that such reorientation is only partially achieved as the blade leaves the surface 26, and is completed during passage through the channel 28, formed by the outer wall 10 and the plate 12, due largely to the constraints imposed by the latter component.

Turning now in detail to FIGS. 6 through 10 of the drawings, therein illustrated is a second form of coilable tape rules embodying the present invention, wherein the casing includes bottom and top shells, or housing parts, 34 and 36. The housing parts 34, 36 cooperatively define an opening 40 in the peripheral wall structure, formed by mating (unnumbered) skirt portions, through which opening projects a brake-operating toggle piece, generally designated by the numeral 42; a conventional belt clip 38 is attached to the housing part 36.

Disposed within the casing of the tape rule are a bottom plate 44 and an intermediate plate 46, fastened to one another by screws 47, and a top plate 48; the top and bottom plates 44, 48 are mutually spaced by three posts 50, secured by screws 51. It will be appreciated that the bottom and top plates 44, 48 may themselves comprise the housing parts 34, 36, such as by forming integral skirt portions thereon, and that such a construction may be preferred in many instances. The casing has a flat peripheral supporting surface 108 at the end opposite to that in which the aperture 30 is formed, which enables relatively stable seating of the tape rule, on end, with the blade 20 upwardly extended.

A spool 52, for storage of the coiled measuring blade 20, is rotatably mounted between the intermediate plate 46 and the top plate 48. For that purpose, stub axles 54 (only one of which is visible) project from opposite sides of the spool 52 and are journalled in the holes 56 formed through the plates 46, 48.

A pair of low, parallel wall sections 58, 60 are formed on the inside surface of the bottom plate 44 and define the sides of a channel 62. A roller member, generally designated by the numeral 64, is rotatably mounted between the intermediate plate 46 and the top plate 48 and includes a wheel portion 65 which has a surface 66 that is curvilinear in the diametric (or axial) and transaxial planes. Stub axles 68 and 70 extend from the opposite sides of the wheel portion 65, and are received, respectively, in holes 72 and 74 formed through plates 48, 46 to thereby rotatably mount the roller member 64.

As can be seen (especially from FIGS. 9 and 10), upon leaving the spool 52 the measuring blade 20 passes initially about the roller 64, in engagement with the transition surface 66 thereof, and then enters the channel 62, cooperatively defined by the bottom plate 44 and the intermediate plate 46 (in addition to the parallel wall sections 58, 60); the channel 62 leads to the aperture 30 in the peripheral wall of the casing.

Figure 9:
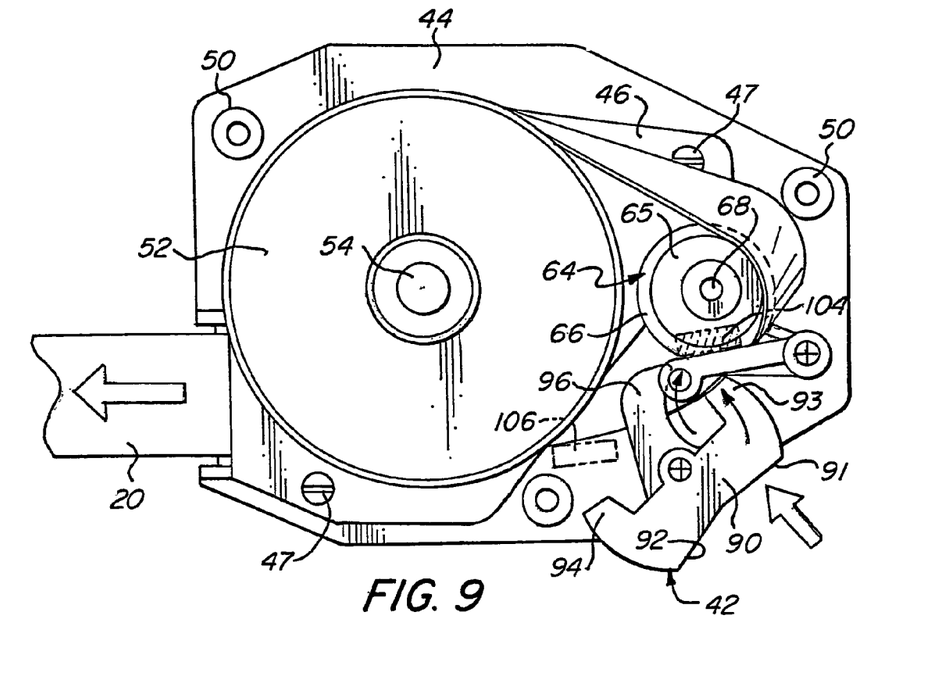
FIGS. 9 and 10 are plan views of the tape rule of FIGS. 6 through 8, illustrating operation of the brake mechanism employed therein.
Figure 10:
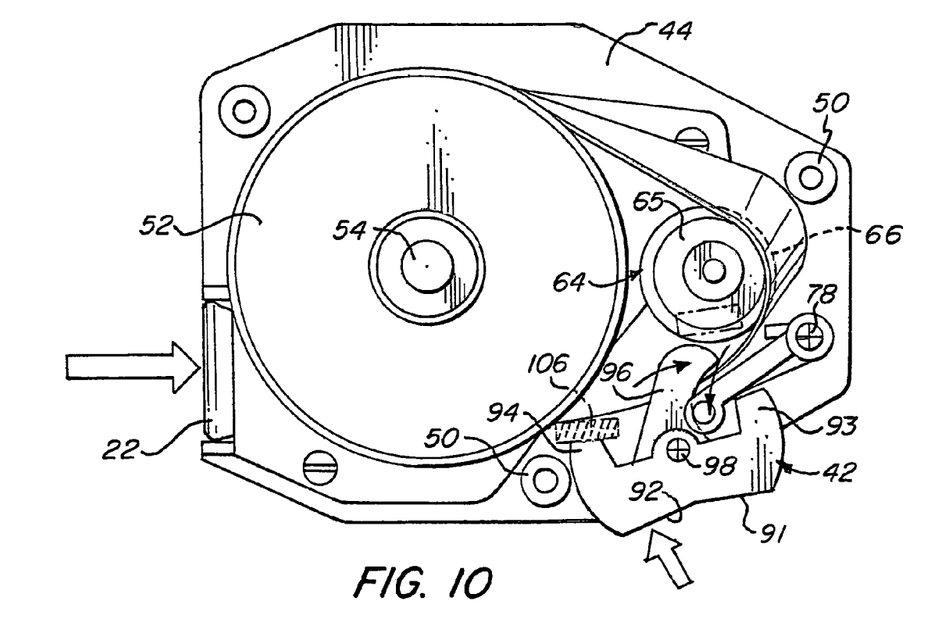

As in the first embodiment described, in passing from the spool 52, with its width dimension parallel to the axis of rotation, the blade 20 is redirected, and gradually reoriented, by movement over the roller member 64 and into the channel 62, so that upon exit from the casing its orientation is perpendicular to the axis of coiling (and parallel to the plates 44, 46, 48, as well as the flat exterior surfaces provided on the casing housing parts 34, 36). It will be appreciated that one advantage of using the roller member 64, rather than stationary transition structure, is that the rotating roller reduces friction and avoids rubbing and binding, as would tend to inhibit smooth operation and produce wear on the blade surfaces (which is of course especially undesirable on the indicia-bearing side).

Figure 8:
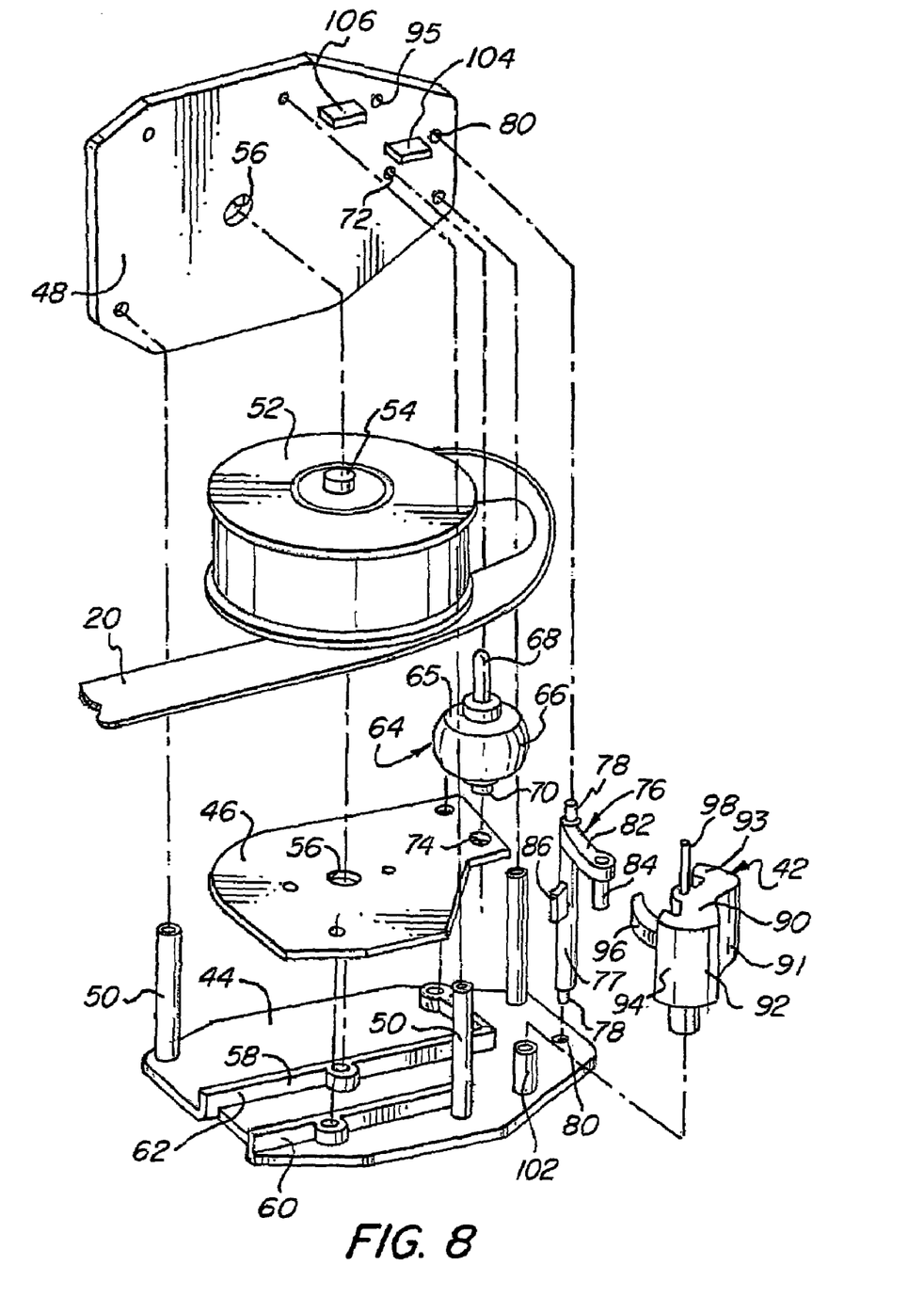
FIG. 8 is an exploded perspective view showing the internal components of the tape rule of FIGS. 6 and 7.

FIGS. 8 through 10 also depict, in greater detail, the brake mechanism that is provided in the tape rule. In addition to the toggle piece 42, the mechanism includes a locking piece, generally designated by the numeral 76, comprised of a shaft 77 having reduced-diameter opposite end portions 78 engaged in holes 80 in the bottom and top plates 44, 48 to mount the locking piece 76 for pivotal movement on an axis parallel to the axes of rotation of the spool 52 and the roller member 64. An actuating arm 82 extends generally radially from the shaft 77 of the locking piece 76, and supports a downwardly extending pin 84 at its free outer end. A locking tab 86 projects radially from a central location on the shaft 77, and is positioned for movement, by pivoting of the locking piece 76, toward and away from the surface 66 of the wheel 65 on the roller member 64.

The toggle piece 42 consists of a body 90 having wing portions 91, 92 with gently divergent sloped surfaces for receiving finger pressure, and ear portions 93, 94 which project inwardly from the wing portions 91, 92 and are disposed to opposite sides of the axis of pivoting; the toggle piece is pivotably mounted on a pin 98 having opposite ends received in the hole 95 and the bore of the short post 102 on the top and bottom plates 48, 44, respectively. A hook element 96 extends inwardly from the body 90 of the toggle piece 42, and two stop elements 104, 106 depend from the underside of the plate 48.

Operation of the brake mechanism is as follows: Pressing upon the wing portion 91 of the toggle piece 42, as indicated by the open arrow in FIG. 9, effects pivoting in the counterclockwise direction and causes the ear portion 93 to bear upon the arm 82 of the pivot piece 76, and thereby to rotate the pivot piece 76 in the clockwise direction, as limited by the stop element 104. Doing so brings the locking tab 86 into engagement with the rule blade 20, pinching it against the surface 66 of the roller wheel 65 and thereby locking the blade 20 against further movement inwardly or outwardly of the casing.

To effect release of the brake, the wing portion 92 is pushed inwardly (as indicated by the open arrow in FIG. 10), causing the toggle piece 42 to rotate in the clockwise direction. The hook portion 96 is thereby caused to engage the depending pin 84 on the arm 82, pivoting the locking piece 76 in the counterclockwise direction (as limited by abutment of the ear portion 94 against the stop element 106) and, in turn, moving the tab 86 away from the wheel 65 and out of contact with the blade 20. That of course releases the blade 20 and permits retraction of its extended portion, which occurs automatically under the force of a power-return motor (not shown, but, typically taking the form of the spring 19 depicted in FIG. 2).

Turning now to FIGS. 11-14 of the drawings, therein illustrated is a preferred form of tape rule embodying the present invention and utilizing a further improved form of reorienting means, comprised of two roller members, generally designated by the numerals 110 and 112, respectively. The roller member 110 consists of a wheel portion, or central section 114, from the opposite sides of which stub axle portions 116 extend. It will be appreciated that the center wheel portion 114 of the roller member 110 is circular in axial planes (i.e., planes extending on and along the axis of rotation of the roller member) as well as in transaxial planes, perpendicular thereto. The roller member 110 is structurally similar to the roller member 64, hereinabove described with reference to FIGS. 8-10, but is oriented at an angular relationship to the outer wall 124 of the casing (or housing) base, generally designated by the number 120, rather than being disposed normal thereto.

Figure 13:
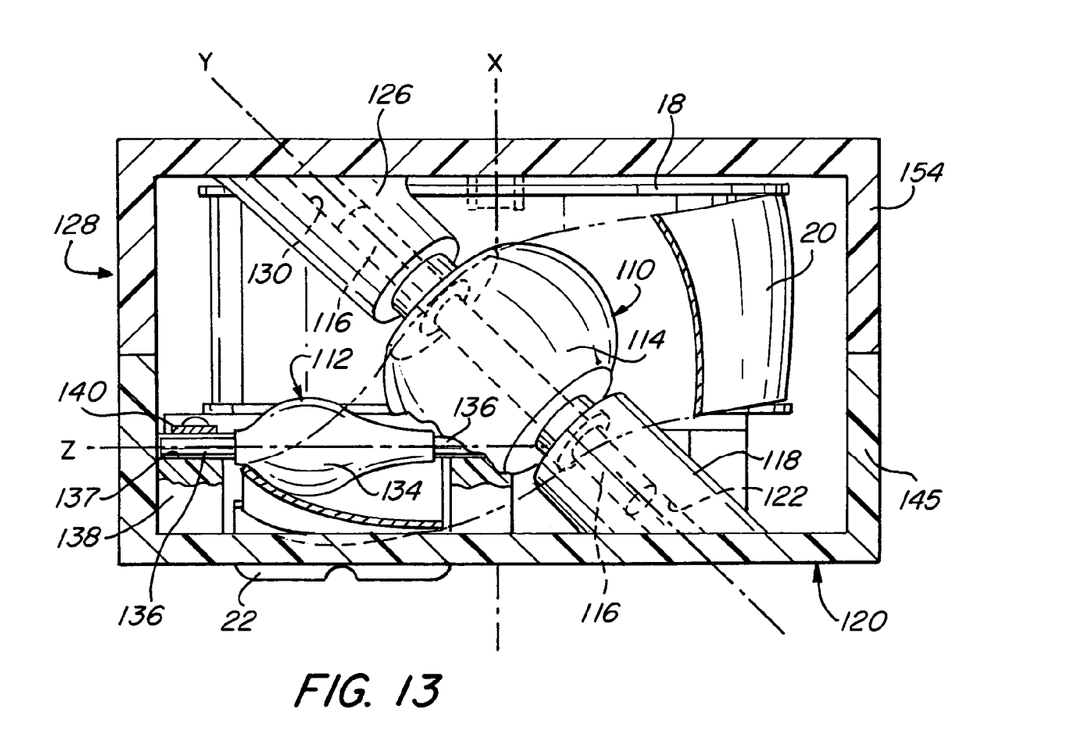
FIG. 13 is a sectional view of the tape rule of FIGS. 11 and 12, taken along line 13-13 of FIG. 12 and drawn to an enlarged scale.

The casing base 120 is formed to provide generally cylindrical mount structure 118, which extends at an angle "Y" of about 45° to the coiling axis "X" of the spool 18 on which the measuring blade 20 is mounted; this is best seen in FIG. 13. The mount structure 118 cooperates with similar generally cylindrical mount structure 126, formed on the casing cover, generally designated by the number 128. Bores 122, 130, extending inwardly from the free outer ends of the mount structures 118, 126, respectively, receive stub axles 116 so as to rotatably mount the roller member 110, as described.

Figure 12:
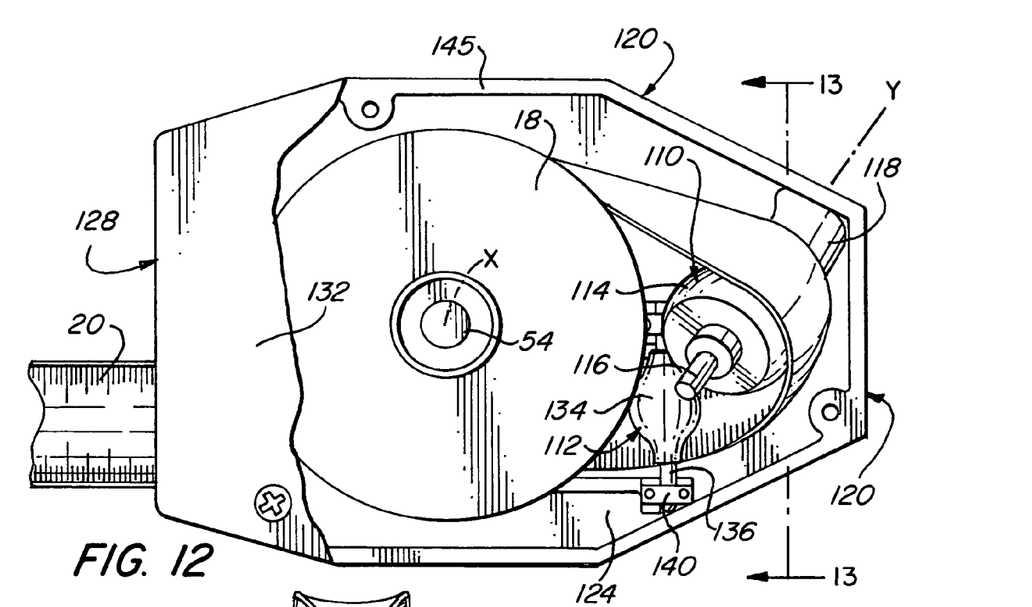
FIG. 12 is a plan view of the tape rule of FIG. 11, also having portions broken away to expose internal features.
Figure 14:
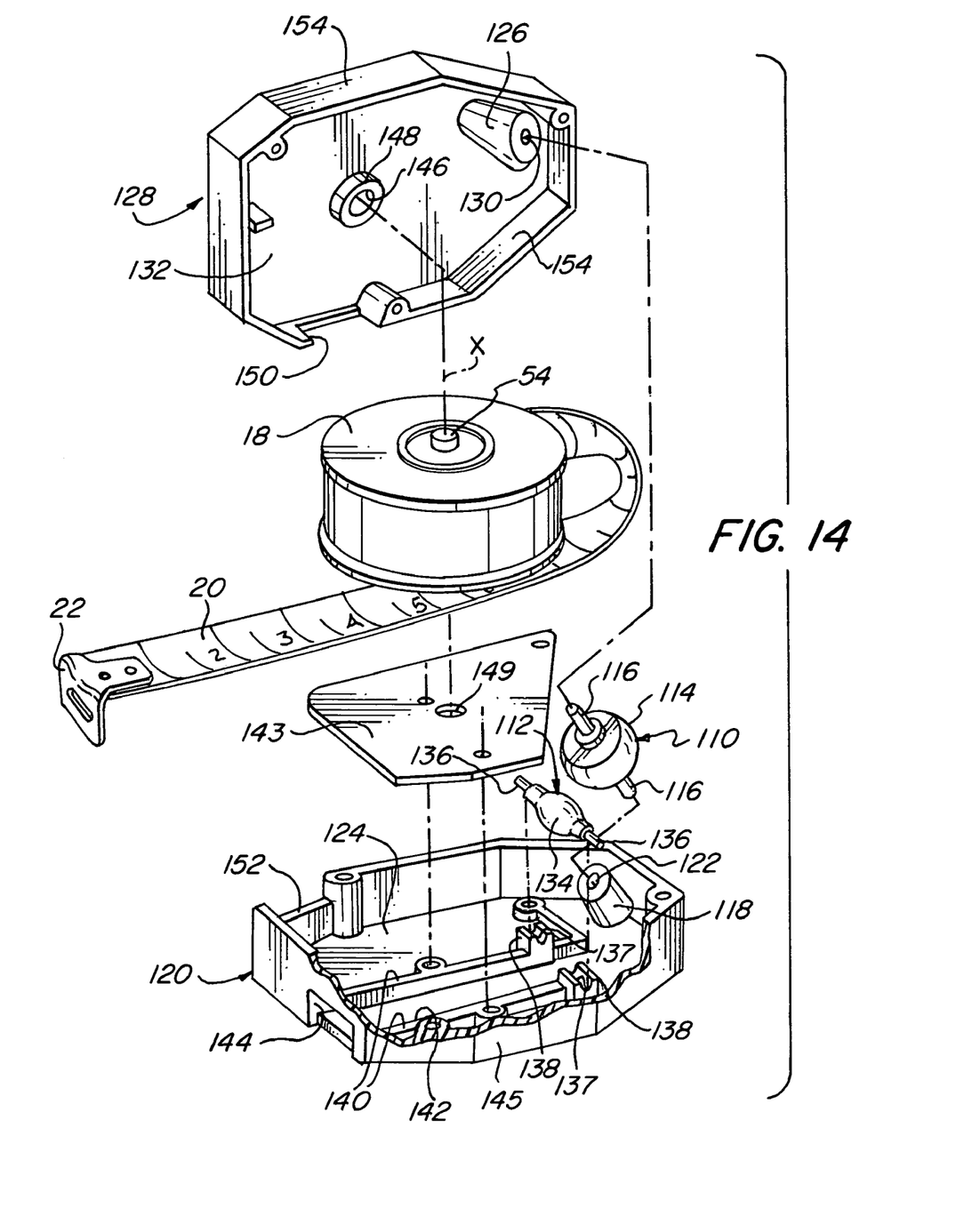
FIG. 14 is an exploded perspective view showing the components of the tape rule of FIGS. 11-13, with a portion of the skirt on the casing base again being broken away to expose internal features.

In addition to being angularly oriented (at angle "Y") in transverse relationship to the axis of coiling, the axis of rotation of the roller member 110 is inclined as well (taken with reference to the outer wall 124 of the housing base 120), toward the axis of coiling. This is best seen in FIG. 12, but can also be appreciated by noting the relative positions of the mount structures 118, 126 on the base and cover components 120, 128, with reference to the rear end sections of the peripheral skirt portions 145, 154 thereof, as seen in FIG. 14.

The second roller member 112 also consists of a central section 134, from which extends stub axles 136, and is of generally similar construction to roller member 110, although somewhat smaller. In member 112, moreover, the central section 134 is of generally elliptical form, taken in planes extending on and along the axis thereof, while being circular however in transverse transaxial planes.

The stub axles 136 of the roller member 112 are journalled in cylindrical recesses 137 formed into small block elements 138, which project slightly above the parallel wall sections 140 that define the sides of a channel 142 on the inside surface of the wall 124 of the base 120. The stub axles 136 are held in place within the recesses 137 by small cap plates 140, fastened upon the upper surfaces of the block elements 138; the channel 142 leads to the peripheral aperture 144, formed in the skirt portion 145 on the casing base 120. It will be noted that the axis of rotation "Z" of the roller member 112 is parallel to the plane of the wall 124 and perpendicular to the axis of coiling "X", as best seen in FIG. 13.

A mounting plate 143 is fastened over the channel 142 and is formed with a central hole 149 for rotatably receiving one of the stub axles 54 (not visible) of the blade-mounting spool 18. The other stub axle 54 on the spool 18 is rotatably received in a circular recess 146 defined within a projecting hub structure 148 on the wall 132 of the casing cover 128.

Indentations 150, 152 are formed, respectively, into the skirt portions 154 and 145 on the casing cover 128 and casing base 120, respectively. Albeit no brake mechanism is illustrated in these figures, it will be appreciated that the rule will normally employ such a mechanism (as well as including, as appropriate, other features that are described with reference to previous figures hereof and/or that are conventional in the art); the indentations 150, 152 cooperate to define an opening through which an operating button, slide or switch for a brake mechanism would project.

Figure 11:
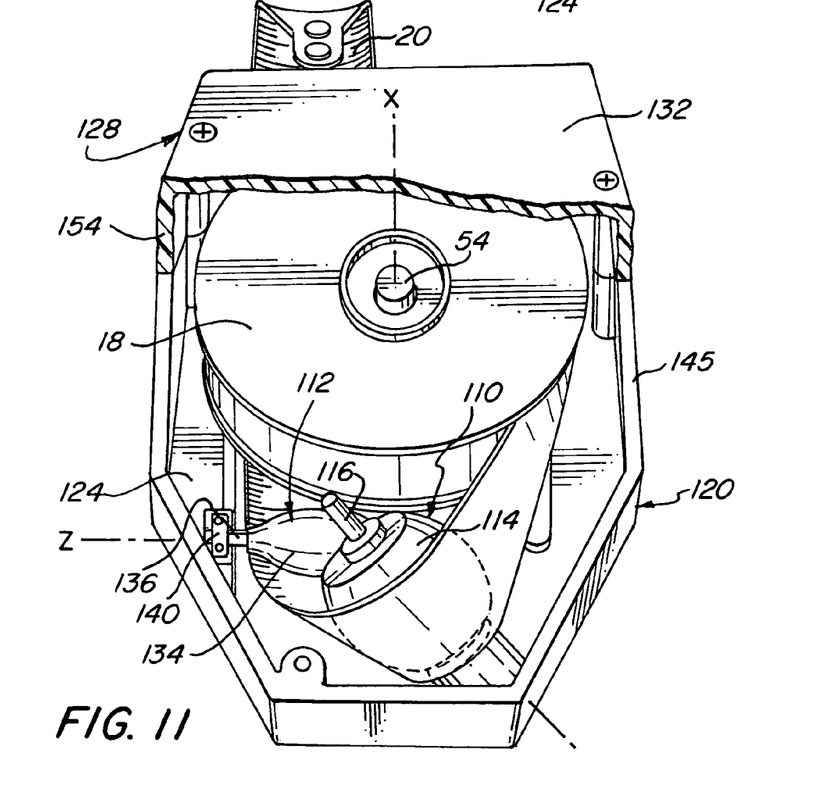
FIG. 11 is a perspective view of a preferred form of coilable tape rule embodying the present invention, taken from the rear and having a portion of the casing cover broken away to expose internal features.

As best seen in FIGS. 11-13, the curvilinear cross-sectional contours of the roller members 110, 112 (taken in axial planes) are such that their transition or contact surfaces are caused to engage, in loosely conforming relationships, with the facing surface of the concavo-convex measuring blade 20 employed. The arrangement and structures described facilitate passage of the blade through the casing, and enable it to radically change direction and orientation with a minimum amount of friction, binding and drag; they also serve to center the blade, with good and well-distributed surface contact, and improve its tracking along the intended travel path. These attributes in turn contribute to the smoothness and reliability of operation, while minimizing wear upon the indicia-bearing surface of the blade (which is of course the surface that engages the roller members). The orientation of the canted roller (over which the blade passes directly from and to the winding spool), in angled relationships both transversely of and inclined toward the axis of coiling, also contributes substantially to the desirable nature of blade movement.

As indicated above, while the roller member that lies most directly adjacent to the blade-mounting spool is desirably of generally spherical shape, and the more distal roller member is desirably of generally elliptical shape, contour variations are of course possible as long as an adequately conforming surface is presented to the measuring blade concavity. The optimal shape of the roller member will depend to some extent upon its position within the casing, both from the standpoint of the contour of the blade as it may be constrained in the contact zone (i.e., the blade may tend to flatten as it reverses, upon leaving or reentering the spool), and also from the standpoint of the space available, which will usually be more limited in the lower part of the casing adjacent the guide channel structure. Optimal shapes for the roller members will be apparent to those skilled in the art, in light of the disclosure provided herein.

It will be appreciated that the various parts and components of the coilable tape rule disclosed herein may be made of metal or plastic, as will be evident to those skilled in the art; the measuring blade will of course usually be made of steel, often with a plastic coating. It will also be appreciated that many variations in the form, combination, and arrangement of the parts and components of the instant tape rule can be made without departure from the concept and definition of the invention. For example, although measuring blade guide channels have been described herein for use in combination with other transition structures, channel-defining structure may be so formed as to alone produce the required reorientation of the blade. Also, while the transition means described serves to gradually rotate the blade through a quarter turn on its longitudinal axis, other angles of reorientation, and more abrupt turning, may be desirable in certain cases.

Thus it can be seen that the present invention provides a novel coilable tape rule wherein the casing affords stable support and enables self-standing positioning, with the blade extended, with minimal concern for inadvertent displacement from a selected location. The invention provides, more specifically, a coilable tape rule in which the measuring blade is reoriented, as it is extended from the casing, to a relationship that is nonparallel, and normally perpendicular, to the axis of coiling. Extension and retraction of the measuring blade occurs smoothly and reliably, with steady tracking and without undue rubbing, drag, binding or material wear.

Having thus described the invention, what is claimed is:

1. A coilable tape rule, comprising: a rule casing comprised of at least one wall having an effectively planar exterior surface, and a peripheral wall extending about said at least one wall, said peripheral wall having an aperture to the interior of said casing; means for mounting a coiled measuring blade within said rule casing for extension therefrom and retraction thereinto through said peripheral wall aperture; a flexible measuring blade mounted upon said means for mounting, said measuring blade having a length dimension and a transverse width dimension and being coilable about an axis of coiling in said casing normal to said exterior surface of said at least one wall and with said width dimension of said measuring blade oriented parallel to said axis of coiling, said measuring blade being preformed to have a concavo-convex transverse cross section in said width direction, in its free state, and being wound on said means for mounting with the concave side thereof facing inwardly toward said axis of coiling; and reorienting means for turning said measuring blade through about a quarter turn on its longitudinal axis so as to reorient said width dimension to a substantially perpendicular relationship to said axis of coiling as said measuring blade is extended from said casing, said reorienting means comprising a pair of rollers disposed within said rule casing, one of said rollers being rotatably mounted adjacent said at least one wall of said rule casing with its axis of rotation substantially perpendicular to said axis of coiling of said measuring blade, and the other of said rollers being rotatably mounted in a position displaced from said at least one wall with its axis of rotation oriented generally transversely to said axis of coiling and at an acute included angle thereto, each of said rollers having a central section that is convexly rounded, both in axial planes, extending on and along said axis of rotation thereof, and also in transaxial planes extending perpendicular to said axis of rotation, to provide curvilinear contact surfaces thereon, said measuring blade following a travel path between said means for mounting and said peripheral wall aperture, sequentially over said rollers, with the surface of said measuring blade on the concave side thereof in engagement with said contact surfaces of both of said rollers, said other roller lying more closely adjacent than said one roller to said means for mounting, along said travel path.

2. The tape rule of claim 1 wherein said central section of each of said one and said other rollers is circular in said transaxial planes.

3. The tape rule of claim 2 wherein said central section of said one roller is generally elliptical in said axial planes thereof.

4. The tape rule of claim 2 wherein said central section of said other roller is generally circular in said axial planes thereof.

5. The tape rule of claim 4 wherein said acute angle value is about 45°.

6. The tape rule of claim 5 wherein said axis of rotation of said other roller is inclined at an angle of about 45°.

7. The tape rule of claim 2 wherein said central section of said one roller is generally elliptical in said axial planes thereof and wherein said central section of said other roller is generally circular in said axial planes thereof.

8. The tape rule of claim 1 wherein said acute included angle at which said axis of rotation of said of said other roller is mounted has a value of 30° to 60°.

9. The tape rule of claim 1 wherein said axis of rotation of said other roller is inclined toward said axis of coiling of said measuring blade, taken with reference to said at least one wall.

10. The tape rule of claim 1 wherein said reorienting means additionally includes channel-defining structure within said casing, extending between said one roller and said peripheral wall aperture and dimensioned and configured for slidably receiving and laterally constraining said measuring blade.

11. The tape rule of claim 1 wherein said means for mounting comprises a spool for coilably receiving said measuring blade, said spool being mounted for rotation about said axis of coiling.

12. The tape rule of claim 1 wherein said casing comprises a pair of spaced, substantially parallel sidewalls, wherein said peripheral wall extends therebetween and thereabout, and wherein said axis of blade coiling is oriented substantially normal to both of said sidewalls.

13. The tape rule of claim 1 wherein said aperture is proximate said at least one wall, and wherein the measurement indicia on the extended portion of said measuring blade faces in the direction opposite to said exterior surface of said at least one wall.

14. The tape rule of claim 1 additionally including means for effecting retraction, into said casing, of an extended portion of said measuring blade.

15. The tape rule of claim 14 wherein said means for effecting retraction comprises a spring that constantly applies retracting force upon said means for mounting.

16. The tape rule of claim 14 additionally including a brake mechanism operative for releasably securing said measuring blade in positions extended from said casing.

* * * * *